(12) United States Patent
Brisley et al.

(10) Patent No.: US 9,114,385 B2
(45) Date of Patent: Aug. 25, 2015

(54) NO$_x$ ABSORBER CATALYST

(75) Inventors: Robert James Brisley, Duxford (GB); Kenneth David Camm, Letchworth Garden (GB); Noelia Cortes Felix, Reading (GB); Fiona-Mairead McKenna, Reading (GB); Paul James Millington, Reading (GB); Elizabeth Hazel Mountstevens, Royston (GB); Daniel Swallow, Sandy (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 13/996,637

(22) PCT Filed: Dec. 21, 2011

(86) PCT No.: PCT/GB2011/052539
§ 371 (c)(1),
(2), (4) Date: Sep. 5, 2013

(87) PCT Pub. No.: WO2012/085564
PCT Pub. Date: Jun. 28, 2012

(65) Prior Publication Data
US 2013/0336865 A1 Dec. 19, 2013

(30) Foreign Application Priority Data
Dec. 21, 2010 (GB) .................................. 1021649.7

(51) Int. Cl.
*B01D 53/56* (2006.01)
*B01D 53/94* (2006.01)
*B01J 8/02* (2006.01)
*C01B 21/00* (2006.01)
*C01B 23/00* (2006.01)
*C01B 25/00* (2006.01)
*C01B 31/00* (2006.01)
(Continued)

(52) U.S. Cl.
CPC ............. *B01J 23/63* (2013.01); *B01D 53/9422* (2013.01); *B01J 23/626* (2013.01); *B01J 23/89* (2013.01); *B01J 37/0215* (2013.01); *B01J 37/0244* (2013.01); *B01J 37/0246* (2013.01); *F01N 3/0814* (2013.01); *F01N 3/0842* (2013.01); *B01D 2255/1021* (2013.01); *B01D 2255/1023* (2013.01); *B01D 2255/1025* (2013.01); *B01D 2255/204* (2013.01); *B01D 2255/2042* (2013.01); *B01D 2255/2065* (2013.01); *B01D 2255/2073* (2013.01); *B01D 2255/2094* (2013.01); *B01D 2255/20738* (2013.01); *B01D 2255/20746* (2013.01); *B01D 2255/20761* (2013.01); *B01D 2255/9022* (2013.01); *B01D 2255/9025* (2013.01); *B01D 2255/91* (2013.01); *B01J 29/85* (2013.01); *F01N 2330/06* (2013.01); *F01N 2370/02* (2013.01); *F01N 2370/04* (2013.01); *F01N 2510/0684* (2013.01)

(58) Field of Classification Search
CPC ............ B01J 20/00; B01J 20/02; B01J 20/04; B01J 20/08; B01J 20/10; B01J 20/16; B01J 20/18; B01J 21/00; B01J 21/04; B01J 21/06; B01J 21/08; B01J 21/10; B01J 21/12; B01J 21/14; B01J 23/00; B01J 23/02; B01J 23/10; B01J 23/14; B01J 23/34; B01J 23/38; B01J 23/40; B01J 23/42; B01J 23/44; B01J 23/46; B01J 23/56; B01J 23/58; B01J 23/626; B01J 23/63; B01J 23/64; B01J 23/70; B01J 23/72; B01J 23/74; B01J 23/76; B01J 23/78; B01J 23/83; B01J 23/89; B01J 29/00; B01J 29/06; B01J 29/064; B01J 29/068; B01J 29/072; B01J 29/076; B01J 29/85
USPC ......... 502/65, 66, 73, 74, 258–263, 302–304, 502/324, 326–328, 331–341, 349–351, 355, 502/415, 439, 524, 527.12, 527.13, 527.18
See application file for complete search history.

(56) References Cited

U.S. PATENT DOCUMENTS 5,473,887 A   12/1995   Takeshima et al.
6,093,377 A * 7/2000   Iizuka et al. ............... 423/213.5
(Continued)

FOREIGN PATENT DOCUMENTS

| EP | 0602865 A1 | 6/1994 |
|---|---|---|
| EP | 1316354 A1 | 6/2003 |
| EP | 1317953 A1 | 6/2003 |
| EP | 2404669 A1 | 1/2012 |
| JP | 8-117601 | 5/1996 |
| WO | 9947260 A1 | 9/1999 |
| WO | 2004025093 A1 | 3/2004 |
| WO | 2005092481 A1 | 10/2005 |
| WO | 2008047170 A1 | 4/2008 |
| WO | 2008067375 A1 | 6/2008 |
| WO | 2009118593 A1 | 10/2009 |
| WO | 2009158453 A1 | 12/2009 |
| WO | 2010101219 A1 | 9/2010 |

OTHER PUBLICATIONS

International Search Report dated Mar. 13, 2012 from corresponding International Application No. PCT/GB2011/052539 filed Dec. 21, 2011.

*Primary Examiner* — Cam N. Nguyen
(74) *Attorney, Agent, or Firm* — Kevin M. Carroll

(57) ABSTRACT

A NO$_x$ absorber catalyst comprising a substrate monolith coated with one or more washcoat layers and comprising a first component comprising a nitrogen oxide storage component, at least one precious metal and a dispersed rare earth oxide supported on a refractory support material, and a second component comprising a precious metal supported on a bulk reducible oxide that is substantially free of nitrogen oxide storage material, wherein the precious metal present in the second component comprises Pt, Pd or a combination of both Pt and Pd and wherein the bulk reducible oxide is an oxide, a composite oxide or a mixed oxide comprising at least one of manganese, iron, cobalt, copper, tin or cerium.

19 Claims, No Drawings

(51) Int. Cl.

| | |
|---|---|
| *C01B 33/00* | (2006.01) |
| *C01B 35/00* | (2006.01) |
| *C01G 28/00* | (2006.01) |
| *C01G 30/00* | (2006.01) |
| *B01D 50/00* | (2006.01) |
| *B01D 53/34* | (2006.01) |
| *F01N 3/00* | (2006.01) |
| *F23J 11/00* | (2006.01) |
| *B01J 29/00* | (2006.01) |
| *B01J 29/06* | (2006.01) |
| *B01J 21/00* | (2006.01) |
| *B01J 21/04* | (2006.01) |
| *B01J 20/00* | (2006.01) |
| *B01J 23/00* | (2006.01) |
| *B01J 23/02* | (2006.01) |
| *B01J 23/06* | (2006.01) |
| *B01J 23/08* | (2006.01) |
| *B01J 23/10* | (2006.01) |
| *B01J 23/32* | (2006.01) |
| *B01J 23/42* | (2006.01) |
| *B01J 23/44* | (2006.01) |
| *B01J 23/56* | (2006.01) |
| *B01J 23/70* | (2006.01) |
| *B01J 23/72* | (2006.01) |
| *B01J 23/74* | (2006.01) |
| *B01J 23/63* | (2006.01) |
| *B01J 23/62* | (2006.01) |
| *B01J 23/89* | (2006.01) |
| *B01J 37/02* | (2006.01) |
| *F01N 3/08* | (2006.01) |
| *B01J 29/85* | (2006.01) |

(56) References Cited

U.S. PATENT DOCUMENTS

| | | | |
|---|---|---|---|
| 6,265,342 B1 * | 7/2001 | Lim et al. | 502/326 |
| 6,294,140 B1 * | 9/2001 | Mussmann et al. | 423/213.5 |
| 6,350,421 B1 | 2/2002 | Strehlau et al. | |
| 6,420,306 B2 * | 7/2002 | Kurokawa et al. | 502/261 |
| 6,497,848 B1 * | 12/2002 | Deeba et al. | 422/180 |
| 6,562,753 B2 * | 5/2003 | Miyoshi et al. | 502/325 |
| 6,777,370 B2 * | 8/2004 | Chen | 502/241 |
| 7,287,370 B2 * | 10/2007 | Rajaram et al. | 60/274 |
| 7,517,826 B2 * | 4/2009 | Fujdala et al. | 502/60 |
| 7,576,031 B2 * | 8/2009 | Beutel et al. | 502/339 |
| 7,875,573 B2 * | 1/2011 | Beutel et al. | 502/339 |
| 8,211,392 B2 * | 7/2012 | Grubert et al. | 423/213.2 |
| 8,252,258 B2 * | 8/2012 | Muller-Stach et al. | 423/213.2 |
| 8,329,607 B2 * | 12/2012 | Kazi et al. | 502/66 |
| 8,496,899 B2 * | 7/2013 | Imai | 423/239.1 |
| 8,557,204 B2 * | 10/2013 | Nunan et al. | 423/213.5 |
| 8,568,675 B2 * | 10/2013 | Deeba et al. | 423/213.5 |
| 8,637,426 B2 * | 1/2014 | Hoke et al. | 502/339 |
| 2002/0053202 A1 | 5/2002 | Akama et al. | |
| 2002/0141908 A1 * | 10/2002 | Miyoshi et al. | 422/168 |
| 2004/0182071 A1 | 9/2004 | Surnilla et al. | |
| 2004/0198595 A1 * | 10/2004 | Chen | 502/328 |
| 2005/0164879 A1 * | 7/2005 | Chen | 502/328 |
| 2010/0056367 A1 * | 3/2010 | Imai | 502/302 |
| 2011/0154807 A1 * | 6/2011 | Chandler et al. | 60/284 |
| 2011/0305612 A1 | 12/2011 | Müller-Stach et al. | |
| 2012/0183490 A1 * | 7/2012 | Chen et al. | 424/76.1 |
| 2013/0287660 A1 * | 10/2013 | Nunan et al. | 423/213.5 |

* cited by examiner

NOₓ ABSORBER CATALYST

FIELD OF THE INVENTION

The present invention relates to a $NO_x$ absorber catalyst comprising a nitrogen oxide storage component and at least one precious metal, and its use in treating exhaust gas from vehicles powered by lean burn internal combustion engines including vehicles powered by hybrid power sources, e.g., both an electric motor and a lean burn internal combustion engine. $NO_x$ absorber catalysts according to the invention have particular application for treating exhaust gas from vehicular compression ignition engines such as Diesel engines.

BACKGROUND OF THE INVENTION $NO_x$ absorber catalysts (NACs) are known, e.g. from U.S. Pat. No. 5,473,887, and are designed to adsorb nitrogen oxides ($NO_x$) from lean exhaust gas (lambda>1) and to desorb the $NO_x$ when the oxygen concentration in the exhaust gas is actively—as opposed to passively—decreased. Such active decrease in oxygen concentration is known as "regeneration" of the NAC's $NO_x$ adsorption activity or a "purge" of $NO_x$ adsorbed on a NAC. Desorbed $NO_x$ may be reduced to $N_2$ with a suitable reductant, e.g. gasoline fuel, promoted by a catalyst component, such as rhodium, of the NAC itself or located downstream of the NAC. In practice, oxygen concentration can be actively adjusted to a desired redox composition intermittently in response to a calculated remaining $NO_x$ adsorption capacity of the NAC, e.g. to richer than normal engine running operation (but still lean of stoichiometric), to stoichiometric (i.e. lambda=1 composition) or to rich of stoichiometric (lambda<1). The oxygen concentration can be adjusted by a number of means, e.g. throttling, injection of additional hydrocarbon fuel into an engine cylinder such as during the exhaust stroke or injecting hydrocarbon fuel directly into exhaust gas downstream of an engine manifold.

A typical NAC formulation disclosed in the prior art includes a catalytic oxidation component, such as platinum, a significant quantity, i.e. substantially more than is required for a promoter, of a $NO_x$-storage component, such as barium, and a reduction catalyst, e.g. rhodium. One mechanism commonly given for $NO_x$-storage from a lean exhaust gas for this formulation is:

$$NO + \tfrac{1}{2}O_2 \rightarrow NO_2 \qquad (1);$$

and $$BaO + NO_2 + \tfrac{1}{2}O_2 \rightarrow Ba(NO_3)_2 \qquad (2),$$

wherein in reaction (1), the nitric oxide reacts with oxygen on active oxidation sites on the platinum to form $NO_2$. Reaction (2) involves adsorption of the $NO_2$ by the storage material in the form of an inorganic nitrate.

At lower oxygen concentrations and/or at elevated temperatures, the nitrate species become thermodynamically unstable and decompose, producing NO and/or $NO_2$ according to reaction (3) below. In the presence of a suitable reductant, these nitrogen oxides are subsequently reduced by carbon monoxide, hydrogen and hydrocarbons to $N_2$, which can take place over the reduction catalyst (see reaction (4)).

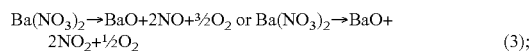

$$Ba(NO_3)_2 \rightarrow BaO + 2NO + \tfrac{3}{2}O_2 \text{ or } Ba(NO_3)_2 \rightarrow BaO + 2NO_2 + \tfrac{1}{2}O_2 \qquad (3);$$

and

$$NO + CO \rightarrow \tfrac{1}{2}N_2 + CO_2 \qquad (4);$$

(Other reactions include $Ba(NO_3)_2 + 8H_2 \rightarrow BaO + 2NH_3 + 5H_2O$ followed by $NH_3 + NO_x \rightarrow N_2 + yH_2O$ or $2NH_3 + 2O_2 + CO \rightarrow N_2 + 3H_2O + CO_2$ etc.).

In the reactions of (1)-(4) above, the reactive barium species is given as the oxide. However, it is understood that in the presence of air most of the barium is in the form of the carbonate or possibly the hydroxide. The skilled person can adapt the above reaction schemes accordingly for species of barium other than the oxide and sequence of catalytic coatings in the exhaust stream.

JP 8-117601 discloses $NO_x$ absorber catalyst comprising the complex oxide $MO \cdot nAl_2O_3$ (M:alkaline earth metal); wherein the composition ratio n is preferably in the range n=0.8-2.5. In the Examples MO was MgO, wherein n is 0.5, 1.0, 1.5, 2.0, 2.5, 3.0 with values of n≥1.5 yielding a pure phase product. The resulting $MgO \cdot nAl_2O_3$ product is combined with the alkali metal potassium or lithium, both platinum and rhodium or palladium alone and barium to produce a $NO_x$ absorber catalyst.

U.S. Pat. No. 6,350,421 discloses a nitrogen oxide storage material which contains at least one storage component for nitrogen oxides in the form of an oxide, mixed oxide, carbonate or hydroxide of the alkaline earth metals magnesium, calcium, strontium and barium and the alkali metals potassium and caesium on a high surface area support material. The support material can be doped cerium oxide, cerium/zirconium mixed oxide, calcium titanate, strontium titanate etc. The purpose of the cerium oxide dopant is to stabilize the specific surface area of the cerium oxide. Dopants are selected from silicon, scandium etc. In a majority of the examples the dopant is zirconium and the support for the storage component is a cerium/zirconium mixed oxide. A representative example consists of a mixture of three powders: barium on a cerium/zirconium mixed oxide; platinum on an aluminium oxide; and rhodium on an aluminium oxide. Barium on pure cerium oxide is used in a comparison example (see U.S. Pat. No. 6,350,421, Comparison Example 4).

EP 1317953 discloses a $NO_x$ absorber catalyst that combines the teachings of JP 8-117601 and U.S. Pat. No. 6,350,421. In particular, the catalyst comprises a homogenous mixed oxide of magnesium oxide and aluminium oxide in a concentration of 1 to 40 wt % based on the total weight of the mixed oxide supporting one or both of platinum and palladium and a nitrogen oxide storage component, such as an oxide, carbonate or hydroxide of magnesium, calcium, strontium or barium, an alkali metal, a rare earth metal or a mixture thereof supported on a metal oxide such as cerium oxide or a cerium mixed oxide, e.g. cerium/zirconium mixed oxide. The use of strontium or barium as nitrogen oxide storage components fixed on a support material of cerium oxide or cerium mixed oxides is said to be especially advantageous. Another partial amount of platinum (see Catalyst C1b) or palladium (see Catalyst C2b) can be deposited directly on the nitrogen oxide storage material. In order to achieve as complete a conversion of the desorbed nitrogen oxides as possible during the regeneration phase, it is said to be advantageous to add rhodium supported on a further support material, preferably optionally stabilised alumina.

WO 2005/092481 discloses a variant of the nitrogen oxide storage material of EP 1317953 which variant comprises a nitrogen oxide storage material which is based on storage compounds of elements selected from the group consisting of magnesium, calcium, strontium, barium, the alkali metals, the rare earth metals and mixtures thereof, wherein a homogeneous magnesium-aluminium mixed oxide doped with cerium oxide is support material for the storage compounds and platinum, wherein the platinum is present either on a different homogeneous magnesium-aluminium mixed oxide doped with cerium oxide from the storage compounds (which is referred to as an oxidation-active component) or the same homogeneous magnesium-aluminium mixed oxide doped with cerium oxide as the storage compounds. Where the platinum is present on the same homogeneous magnesium-aluminium mixed oxide doped with cerium oxide as the storage compounds, the nitrogen oxide storage material includes an oxygen-storing material based on cerium, in particular Ce—Zr mixed oxide. In addition to platinum, palladium can be carried on the oxidation-active component. To achieve very complete conversion of the nitrogen oxides desorbed during regeneration of the storage catalyst rhodium can be carried on a further support material, such as optionally stabilised aluminium oxide. In the specific examples, no platinum group metal is supported on the oxygen-storing material based on cerium, nor is there any suggestion so to do.

WO 2008/067375 discloses $NO_x$ storage materials and traps that are said to be resistant to thermal ageing. A nitrogen oxide storage catalyst comprises a coating on a substrate comprising a nitrogen oxide storage material comprising ceria particles having an alkaline earth oxide, such as barium oxide, supported on the particles, the ceria having a crystallite size of between about 10 and 20 nm and the alkaline earth oxide having a crystallite size of between 20 and 40 nm. The coating further comprises a catalytic component, which comprises at least one member of platinum group metals supported on refractory oxide particles, i.e. not on the ceria particles. Refractory oxide particles screened for use in the Examples include aluminas doped with cerium oxide or a mixture of cerium oxide and zirconium oxide, including 90% $Al_2O_3$, 10% $CeO_2$; 82% $Al_2O_3$, 11% $CeO_2$, 7% $ZrO_2$; and 80% $Al_2O_3$, 20% $CeO_2$. However, none of the refractory oxides tested is based on cerium oxide.

U.S. 2002/0053202 discloses an exhaust gas purifying system for a Diesel engine comprising a mixture of a $H_2$ supplying catalyst ($Pt/CeO_2$) and a soluble organic fraction (SOF) adsorbing-oxidising catalyst ($Pt/La—SiO_2$) disposed on a first flow through substrate monolith and $NO_x$ absorbing catalyst ($Ba/Pt—Rh/Al_2O_3$) disposed on a second flow-through substrate monolith located downstream of the first substrate monolith.

WO 2004/025093 discloses a substrate monolith comprising a $NO_x$ absorber, palladium supported on a first support material associated with at least one base metal promoter and platinum supported on a second support material. The base metal promoter can be a reducible oxide, such as an oxide of manganese, iron, copper, tin, cobalt or cerium, and the reducible oxide may be dispersed on the first support material or the support material per se may comprise particulate bulk reducible oxide. The $NO_x$ absorber can be at least one alkali metal, at least one alkaline earth metal, at least one rare earth metal e.g. lanthanum or yttrium or any two or more thereof. In a particular embodiment, the $NO_x$ absorber includes both Pt and Rh, the latter for catalysing $NO_x$ reduction to $N_2$, although the Rh can be disposed downstream of the $NO_x$ absorber. In one embodiment, the supported Pt component is in a first layer and the supported Pd component and the associated at least one base metal promoter is in a second layer overlying the first layer. Alternatively, all components can be present in a single washcoat layer. The substrate monolith can be a flow-through substrate monolith or a filter.

Historically, vehicular Diesel engines have been designed to meet some combination of four features: fuel efficiency; control of $NO_x$ emissions; power output; and particulate matter control. Early emission standards limited the quantity of carbon monoxide and hydrocarbon that it was permissible to emit, which forced fitment of Diesel oxidation catalysts to meet the standards. By the inception of Euro 5 emission standards were most easily met by tuning the engine to control $NO_x$ emissions and providing a filter in the exhaust system to trap particulate matter (the so-called $NO_x$/particulate matter trade-off). For Euro 6 and proposals in the US, it appears to be difficult to meet particulate emission standards (which now include a requirement to reduce particulate number emissions) without a filter, whether additional catalyst-based $NO_x$ removal strategies are required in addition. Whilst it is possible, therefore, to conceive of an exhaust system comprising a $NO_x$ absorber catalyst on a flow-through substrate monolith in the absence of a filter for use in meeting e.g. European emission standards, generally we expect that a system comprising a $NO_x$ absorber catalyst on a flow-through substrate monolith will be used in some combination with a filter, or the $NO_x$ absorber catalyst will be coated on a filtering substrate monolith, e.g. a wall-flow filter.

A typical exhaust system arrangement for a light-duty Diesel vehicle comprises a $NO_x$ absorber catalyst on a flow-through substrate monolith and a catalysed soot filter (CSF) disposed downstream (i.e. in the ordinary flow direction) thereof. Typical problems associated with $NO_x$ absorber catalyst development for use in such systems include $NO_x$ storage and $NO_x$ regeneration under low temperature, relatively high flow rate and relatively high hydrocarbon exhaust gas conditions. Modern Diesel vehicles generally use an engineering solution known as exhaust gas recirculation (EGR) in order better to control $NO_x$ emissions, wherein a portion of the exhaust gas is recirculated to the engine inlet during at least some of an internally programmed engine speed/load map. The point in the exhaust system from where the exhaust gas for EGR is taken contributes to the above problems. One typical arrangement is to take EGR exhaust gas from downstream of the CSF, so-called low pressure (or "long-loop") EGR.

We have investigated the activity of $NO_x$ absorber catalysts comprising a first component of PtPd supported on a homogeneous mixed oxide of magnesium oxide and aluminium oxide (i.e. magnesium aluminate) and a second component of a barium compound supported on a Ce—Zr mixed oxide according to the Examples and Table 3 in EP 1317953. Each component was prepared separately. What we found was that when the first and second components were each prepared separately and the catalyst components were physically mixed, the $NO_x$ storage of the fresh $NO_x$ storage activity of the reconstituted catalyst was poor. However, when the separately prepared components were combined in a washcoat the $NO_x$ storage activity markedly improved.

We have discovered, very surprisingly, that a $NO_x$ absorber catalyst comprising Pt, Pd or a combination of both Pt and Pd supported on a bulk reducible oxide that is substantially free of nitrogen oxide storage material provides a beneficially active $NO_x$ absorber catalyst. In particular we have found that the $NO_x$ absorber catalysts according to the invention are particularly active: (i) for converting both desorbed $NO_x$ and $NO_x$ contained in rich exhaust gas when the $NO_x$ absorber catalyst has been aged (compared with fresh activity); and (ii)

for oxidation of carbon monoxide and hydrocarbon at relatively low temperature in lean exhaust gas. Preferred embodiments of bulk reducible oxides include bulk cerium oxide ($CeO_2$ also referred to as ceria) or bulk mixed oxide or composite oxide based on cerium oxide. An aspect of this discovery is believed to reside in that the Pt, Pd or PtPd supported on the bulk reducible oxide generates a significant exotherm and/or hydrogen gas ($H_2$) via the water-gas shift reaction ($CO+H_2O \rightarrow CO_2+H_2$ (mildly exothermic)) as the exhaust gas is enriched with oxidisable components, which exotherm promotes other desirable reactions catalysed by the $NO_x$ absorber catalyst.

SUMMARY OF THE INVENTION

The invention is a $NO_x$ absorber catalyst comprising a substrate monolith coated with one or more washcoat layers and comprising a first component comprising a nitrogen oxide storage component, at least one precious metal and a dispersed rare earth oxide supported on a refractory support material, and a second component comprising a precious metal supported on a bulk reducible oxide that is substantially free of nitrogen oxide storage material, wherein the precious metal present in the second component comprises Pt, Pd or a combination of both Pt and Pd and wherein the bulk reducible oxide is an oxide, a composite oxide or a mixed oxide comprising at least one of manganese, iron, cobalt, copper, tin or cerium.

DETAILED DESCRIPTION OF THE INVENTION

As used herein the term "bulk" to refer to a reducible oxide such as ceria (or any other component) means that the ceria is present as solid particles thereof. These particles are usually very fine, of the order of at least 90 percent of the particles being from about 0.5 to 15 microns in diameter. The term "bulk" is intended to distinguish from the situation in which reducible oxide such as ceria is "dispersed" on a refractory support material e.g. by being impregnated into the support material from a solution of e.g. cerium nitrate or some other liquid dispersion of the component and then dried and calcined to convert the impregnated cerium nitrate to a dispersion of ceria particles on a surface of the refractory support. The resultant ceria is thus "dispersed" onto and, to a greater or lesser extent, within a surface layer of the refractory support. The dispersed ceria is not present in bulk form, because bulk ceria comprises fine, solid particles of ceria. The dispersion can also take the form of a sol, i.e. finely divided particles of e.g. ceria on the nanometer scale.

According to the present invention there is provided a $NO_x$ absorber catalyst comprising a substrate monolith coated with one or more washcoat layers comprising a first component comprising a nitrogen oxide storage component, at least one precious metal and a dispersed rare earth oxide supported on a refractory support material, and a second component comprising a precious metal supported on a bulk reducible oxide that is substantially free of nitrogen oxide storage material, wherein the precious metal present in the second component comprises Pt, Pd or a combination of both Pt and Pd and wherein the bulk reducible oxide is an oxide, a composite oxide or a mixed oxide comprising at least one of manganese, iron, cobalt, copper, tin or cerium.

As explained hereinabove with regard to reactions (1) to (4), the $NO_x$ storage, release and reduction process can be divided into (a) $NO_x$ storage; and (b) $NO_x$ release and reduction phases. The $NO_x$ absorber catalyst according to the invention benefits both phases.

So far as the $NO_x$ release and reduction phase is concerned, we have found, very surprisingly, that following ageing a rhodium component that is widely regarded to be responsible for $NO_x$ conversion under rich conditions at <300° C., e.g. during a rich purge, is less active for $NO_x$ reduction than the platinum and/or palladium supported reducible oxide of the second component. The skilled person will know that on-cycle, e.g. MVEG-B, Diesel exhaust gas temperatures are generally cooler than on-cycle gasoline exhaust gas temperatures. Hence, $NO_x$ reduction activity at lower exhaust gas temperatures is important in Diesel applications. In investigations, we have found that under rich conditions the $NO_x$ conversion activity of an aged second component wherein the bulk reducible oxide is $CeO_2$ is $PtPd/CeO_2 > Pd/CeO_2 > Pt/CeO_2 >$ a supported Rh component at <300° C. Generally, we found that the supported Rh component has higher activity than the second component when the NAC is fresh and at higher Diesel exhaust gas temperatures e.g. >300° C.

Without wishing to be bound by any theory, we believe that this effect results from an increased rate of $NO_x$ desorption during a rich purge, possibly as a result of increased exotherm and/or $H_2$ generated by the Pt-, Pd- or PtPd/bulk reducible oxide, e.g. $CeO_2$, component. We also believe that this exotherm and/or $H_2$ generation effect contributes to better storage post purge, possibly because it assists in "emptying" the $NO_x$ storage capacity more completely before a fresh $NO_x$ adsorption cycle begins.

For the $NO_x$ storage phase, we have found that removal of carbon monoxide and hydrocarbon is important, so that reaction (1) hereinabove may be promoted. This is because net CO and hydrocarbon oxidation is favoured selectively over net NO oxidation at lower temperatures (competing reactions include $NO_2+CO \rightarrow CO_2+NO$ (facile); $NO_2+$"HC"$\rightarrow H_2O$, $CO_2+NO$ (occurring at about 100° C.); and $NO_2$+particulate matter$\rightarrow NO+CO$). We have found, very surprisingly, that a nitrogen storage material in contact with the precious metal supported on a bulk reducible oxide reduces the activity of the second component to oxidise CO and HC. By keeping the second component substantially free of $NO_x$ storage material, not only is the $NO_x$ storage process promoted, but the catalyst has a better overall activity to convert CO and hydrocarbons in the exhaust gas, which is important for meeting a relevant emission standard such as Euro 5 or Euro 6.

In embodiments, the first component and the second component are present in the same washcoat layer. In a preferred arrangement of this embodiment, the first component is present in a different zone of the washcoat layer from the second component.

According to an alternative embodiment, the second component is in a different layer from the first component. In a preferred embodiment of this alternative embodiment, the layer comprising the first component comprises a fourth component comprising a precious metal supported on a bulk reducible oxide, wherein the precious metal present in the second component comprises Pt, Pd or a combination of both Pt and Pd. In particular, the bulk reducible oxide may be an oxide, a composite oxide or a mixed oxide comprising at least one of manganese, iron, cobalt, copper, tin or cerium.

We have also found that, in certain embodiments, the precious metal/reducible oxide, e.g. $Pd/CeO_2$ or $PtPd/CeO_2$ can contribute to passive $NO_x$ storage in the $NO_x$ absorber catalyst (see WO 2008/041470).

The second component can be obtained using standard techniques including incipient wetness impregnation of e.g. a precious metal salt on a bulk ceria support, solid state chemistry or co-precipitation etc. A particularly active catalyst has been obtained by co-precipitation according to EP 0602865.

The presence of palladium in combination with platinum supported on the bulk reducible oxide e.g. ceria can provide a further benefit in that it can prevent sintering of a platinum component (where present). Pt plays an important role in $NO_x$ absorber catalyst activity because it is highly active for reaction (1). However, in use Pt can sinter, thus reducing surface area and its catalyst activity as a consequence. By combining Pt with Pd, Pt surface area can be maintained, resulting in a more stable $NO_2$ production and consequent maintenance of catalytic activity as the $NO_x$ absorber catalyst becomes aged in use. However, we have found, very surprisingly, that the Pd can promote $NO_x$ storage when the Pd is present on the bulk reducible oxide.

According to a particular embodiment, substantially the only precious metal present in the second component is Pd or a combination of both Pt and Pd. According to a related embodiment, the precious metal present in the second component consists essentially of Pd or a combination of both Pt and Pd. According to a further related embodiment, the precious metal present in the second component consists of Pd or a combination of both Pt and Pd.

Further considerations for promoting $NO_x$ storage include sufficient catalyst volume and/or oxidation activity so that sufficient NO oxidation can occur to drive the key $NO_x$ storage reaction (reaction (2))

In embodiments, the bulk reducible oxide is $MnO_2$, $Fe_2O_3$, CuO, CoO, $SnO_2$ and $CeO_2$. Of these, $CeO_2$ or mixed oxides or composite oxides based on $CeO_2$ are preferred.

To increase hydrothermal stability of the product, the bulk reducible oxide can be doped with 0.5 to 80 wt.-% of at least one oxide of an element selected from the group consisting of zirconium, silicon, scandium, yttrium, lanthanum and the rare earth metals or mixtures thereof, based on the total weight of the storage material. However, we have also found that in ceria-zirconia mixed oxides the reducibility (as measured e.g. by Temperature Programmed Reduction) can be important for assisting with $NO_x$ reduction during a purge. In this, we have found that ceria-zirconia mixed oxides having a Ce mole % content of about 60% is more reducible than other mixed oxides having higher e.g. 90 mol % Ce, or lower e.g. 30 mol % Ce and is hence preferred for promoting the $NO_x$ reduction process.

In further embodiments, the bulk reducible mixed oxide or composite oxide comprising at least one of manganese, iron, cobalt, copper, tin or cerium further comprises zirconium oxide, wherein optionally the zirconium content in the mixed oxide or composite oxide is 1 to 25 wt.-%, based on the total weight of the mixed oxide or composite oxide. Preferred bulk reducible mixed oxides or composite oxides include cerium oxide/zirconium oxide and manganese oxide/zirconium oxide.

The refractory support material in the first component can be alumina, magnesia, amorphous silica-alumina, titania, zirconia, a molecular sieve or a mixture, composite oxide or mixed oxide of any two or more thereof, and is preferably a homogeneous magnesium aluminate. We have investigated a number of homogeneous magnesium aluminates for use in the $NO_x$ absorber catalyst according to the present invention and have found that, where the homogeneous magnesium aluminate is represented as $MgO.nAl_2O_3$, $n \geq 1.5$ are preferred. A particularly preferred magnesium aluminate is where n is 4.

We have found that the dispersed rare earth oxide in the first component can assist in reducing $NO_x$ slip during a purge. Our investigations show that in rich exhaust gas rare earth oxides (bulk or dispersed) can generate hydrogen via the water gas shift, a mildly exothermic reaction. As explained above in connection with reactions (3) and (4), the NAC is regenerated by contacting the NAC containing adsorbed $NO_x$ with an exhaust gas having a lower oxygen concentration than normal running conditions, e.g. rich of stoichiometric. However, while the exhaust gas is rich $NO_x$ cannot be adsorbed in the NAC. We have found that by removing the dispersed rare earth oxides e.g. dispersed cerium oxide, from the first component, and/or the bulk reducible oxide e.g. ceria, of the second component, the NAC slips more $NO_x$ to atmosphere during a rich purge than a NAC according to the invention.

We have also found that the presence of the dispersed cerium oxide particularly in combination with Pt/Pd in the first component enhances desulfation of the NAC at above about 550° C. A problem with the process of adsorbing $NO_x$ on a NAC is that $SO_2$ is adsorbed on the NAC by similar mechanisms to adsorption of $NO_x$. A difficulty, however, is that adsorbed $SO_x$ e.g. barium sulfate, is generally more hydrothermally stable than adsorbed $NO_x$ e.g. barium nitrate and are not removed during a normal $NO_x$ purge. What this means is that sulfates present in engine fuel and lubricants can become adsorbed on the active sites of the NAC blocking them and, over time, the capacity of the NAC to perform its primary purpose is eroded. In order to maintain $NO_x$ adsorption activity exhaust systems comprising NACs are generally configured intermittently to run a desulfation regime, wherein the NAC is exposed to higher temperatures and/or richer exhaust gases than during a normal $NO_x$ purge. However, such desulfation regimes come at a fuel penalty. By reducing the temperature at which a NAC desulfates, advantageously such fuel penalty can be reduced, to the benefit of the driver and the vehicle manufacturer.

The dispersed rare earth oxide in the first component comprises oxides of elements selected from the group consisting of cerium, praseodymium, neodymium, lanthanum, samarium and mixtures thereof. Preferably, the rare earth oxides are cerium oxide and/or praseodymium oxide and most preferably cerium oxide.

The nitrogen oxide storage component for use in the present invention can be selected from the group consisting of alkaline earth metals e.g. magnesium, calcium, barium and strontium, alkali metals such as potassium and caesium, rare earth metals and combinations of any two or more thereof, with one or both of barium and strontium preferred and barium particularly preferred. Methods of fixing the $NO_x$ storage component to the refractory support material are known in the art and include impregnation such as incipient wetness impregnation and drying, optionally spray drying, co-precipitation, solid state chemistry, etc.

According to a particular embodiment, wherein one or both of the first and second components comprise a combination of both platinum and palladium, and wherein the combined total mass ratio of Pt:Pd in the first and second components is ≤3 at constant platinum group metal cost: is ≤3:1, such as 2:1, 1.5:1 or even 1:1. While removing too much Pt can undesirably decrease NO oxidation, which is key to $NO_x$ storage (see reactions (1) and (2) hereinabove), we have found that increasing the mass ratio of Pd to Pt at constant precious metal cost may enhance rich $NO_x$ activity after high temperature ageing. We believe that this effect may result from alloying of the Pt and Pd.

Summarising some of the effects that we believe are synergistically combined in the claimed invention, the first component: (i) oxidises CO and hydrocarbon to meet a relevant emission standard for these species; (ii) contributes to NO oxidation and $NO_x$ storage (reactions (1) and (2)) (iii) $NO_x$ release during active rich purge as a result of exotherm generation (e.g. $CO+(O_2) \rightarrow CO_2$) and/or $H_2$ generation (derived from the water-gas shift reaction); (iv) $NO_x$ reduction (promoted by $H_2$ generation); and (v) generation of ammonia ($NH_3$), possibly resulting from $H_2$ generation, which can be used to reduce $NO_x$ on a suitable downstream selective catalytic reduction catalyst, e.g. CuCHA.

The second component: (a) also oxidises CO and hydrocarbons; (ii) provides lean $NO_x$ storage; (iii) (through interaction of the PGM and the $NO_x$ storage material) promotes $NO_x$ release; (iv) assists in reducing $NO_x$ slip during a purge; and (v) may enhance desulfation of the NAC at above 550° C. through additional $H_2$ generation.

In a particular embodiment, the $NO_x$ absorber catalyst comprises a plurality of layers, wherein a lower layer comprises the first component and wherein a layer overlying the lower layer comprises a third component comprising rhodium supported on a refractory support material. The rhodium support material can be selected from the group consisting of alumina, a composite oxide or a mixed oxide based on cerium oxide and a composite oxide or a mixed oxide based on zirconium oxide optionally doped with one or more rare earth elements. Preferred composite or mixed oxides are based on cerium oxide include ceria/zirconia mixed oxides. For improved NAC activity, however, it is preferable, where a zirconium-based composite or mixed oxide is used to combine it with a reducible oxide, such as a sol, e.g. a ceria sol. The supported Rh component is generally active for promoting $NO_x$ reduction in a fresh $NO_x$ absorber catalyst and at greater than about 300° C. in an aged $NO_x$ absorber catalyst.

Where the first and second components are combined in the same washcoat layer, it can be difficult to prevent $NO_x$ storage component from migrating from the first component to the second component. One method of avoiding $NO_x$ storage component migration is to pre-fix the $NO_x$ storage component to the refractory support material e.g. by spray drying and then carefully to adjust and maintain the pH of the washcoat to the isoelectric point of the $NO_x$ storage component, thereby substantially preventing the $NO_x$ storage component (even when pre-fixed) from migrating from its support. Of course, this method is only available where the pH used does not promote migration of other components within the washcoat layer.

Where contact of the Pt and/or Pd supported on bulk reducible oxide with $NO_x$ storage component disposed in the same layer as the $NO_x$ storage component cannot be avoided, we prefer to locate the second component in a different layer from the $NO_x$ storage component, e.g. overlying the layer containing the $NO_x$ storage component, or on the same "level" as the $NO_x$ storage component but in a different zone segregated from the $NO_x$ storage component.

Where the second component is disposed in a different layer from the first component and a layer comprising the third component is also present, preferably the second component layer overlies the third component layer, i.e. the lowest layer (the layer coated directly onto the substrate monolith) comprises the first component, overlying which is the above-mentioned third component-containing layer such that an outer layer comprises the second component. We have found that at 250° C., a three layer NAC construct, wherein the first (lower) layer comprises PtPd, Ba, bulk $CeO_2$ and dispersed ceria (from a cerium salt) and a second layer catalyst comprising a ceria-zirconia mixed oxide supporting rhodium and a third layer (over the rhodium layer) comprising $Pt/CeO_2$ shows improved $NO_x$ conversion during a $NO_x$ purge than the same NAC, but without the third layer. However, at 325° C., there was substantially no difference in $NO_x$ conversion between the two catalysts.

The inventors believed that it was the $Pt/CeO_2$, which is substantially free of nitrogen oxide storage material that was responsible for the $NO_x$ conversion at 250° C. and not the $Rh/CeZrO_2$. To test this theory, they made an identical three layer catalyst but left out the rhodium. Comparing the $NO_x$ reduction activity of the catalysts at 250° C., it was found that they had similar $NO_x$ reduction activity during a $NO_x$ purge. Hence, it is concluded that the presence of a precious metal supported on a bulk reducible oxide that is substantially free of nitrogen oxide storage material benefits $NO_x$ reduction performance as well as $NO_x$ storage, as it promotes NO oxidation.

The skilled person is aware of various techniques for forming one or more zones on a substrate monolith, for example using the Applicant's WO 99/47260, i.e. comprising the steps of (a) locating a containment means on top of a support, (b) dosing a pre-determined quantity of a liquid component into said containment means, either in the order (a) then (b) or (b) then (a), and (c) by applying pressure or vacuum, drawing said liquid component into at least a portion of the support, and retaining substantially all of said quantity within the support.

In embodiments comprising two or more layers, a layer overlying a lower layer comprising the first component can comprise at least one molecular sieve. One such preferred arrangement comprises three layers, wherein a layer comprising the molecular sieve is disposed between a layer comprising the lower layer and a layer comprising the third component. This arrangement is particularly beneficial where the precious metal in the lower layer comprises palladium. This is because palladium can poison the catalytic reduction activity of the rhodium. We have found that the molecular sieve present in a layer between the lower layer and the layer comprising rhodium can, in certain washcoat compositions, substantially prevent the palladium from contacting the rhodium, i.e. the palladium is held within the molecular sieve layer. Of course, in the latter arrangement it is possible to locate molecular sieve also in the layer comprising rhodium. Alternatively, or additionally, to the molecular sieve layer, Pd migration may be prevented by use of a Pd salt complexed with a bulky ligand or by appropriate choice of precious metal salts so that the washcoat pH is at or close to the isoelectric point of the precious metal salt, thereby reducing or preventing metal migration.

In another arrangement comprising three layers, a layer comprising the molecular sieve overlies a layer comprising the third component. We have found that this arrangement promotes HC storage at light-off and catalyses the oxidation of CO more effectively.

Preferred molecular sieves include those having the CHA and BEA frameworks, and can contain promoted metals such as copper and/or iron.

The molecular sieve can also be a silicoaluminophosphate (SAPO), such as SAPO-34 (a CHA). Aluminosilicate zeolites, such as SSZ-13 (also a CHA) can also be used. We have found that the use of copper-promoted molecular sieves in the arrangement wherein the molecular sieve is present in an outer-most layer is particularly beneficial, in that the catalyst is better able to treat $NO_x$ during high temperature rich conditions. In this regard, Cu/SAPO-34 is more active than Cu/SSZ-13, and we speculate that the phosphorus in the SAPO CHA framework is playing a role in Cu the location of the copper in active sites within the framework.

According to a further aspect, there is provided an exhaust system for a lean-burn internal combustion engine comprising a $NO_x$ storage catalyst according to the invention.

According to a further aspect, there is provided a vehicle comprising an exhaust system according to the invention.

According to a further aspect, the invention provides a method of treating exhaust gas from a lean burn internal combustion engine, which method comprising the steps of contacting lean exhaust gas containing nitric oxide with a $NO_x$ absorber catalyst according to the invention, and intermittently contacting the $NO_x$ absorber catalyst with enriched (including lambda>1 (but richer than normal engine operating conditions), lambda=stoichiometric or lambda<1) exhaust gas.

The following examples merely illustrate the invention. Those skilled in the art will recognize many variations that are within the spirit of the invention and scope of the claims.

EXAMPLE 1

Preparation of Catalyzed Substrates

Comparative Substrate 1A:

A 400 cells per square inch (cpsi) flow-through cordierite substrate monolith is coated with a $NO_x$ absorber catalyst formulation comprising (1) 94 g/ft$^3$ Pt and 19 g/ft$^3$ Pd, 2 g/in$^3$ cerium dispersed alumina, 1 g/in$^3$ particulate ceria, and 400 g/ft$^3$ Ba; and (2) 10 g/ft$^3$ Rh supported on 0.5 g/in$^3$ 85 wt. % zirconia doped with rare earth elements. The $NO_x$ absorber catalyst is coated on the virgin substrate monolith using the method disclosed in WO 99/47260, followed by drying for 30 minutes in a forced air drier at 100° C. and then firing at 500° C. for 2 hours.

Substrate 1B:

A 400 cells per square inch (cpsi) flow-through cordierite substrate monolith is coated with a $NO_x$ absorber catalyst formulation comprising (1) 84 g/ft$^3$ Pt and 19 g/ft$^3$ Pd, 1 g/in$^3$ cerium dispersed alumina, 1 g/in$^3$ particulate ceria, and 400 g/ft$^3$ Ba; (2) a further 10 g/ft$^3$ Pt supported on 1 g/in$^3$ particulate ceria; plus (3) 10 g/ft$^3$ Rh supported on 0.5 g/in$^3$ 85 wt. % zirconia doped with rare earth elements. The $NO_x$ absorber catalyst are coated on the virgin substrate monolith using the method disclosed in WO 99/47260, followed by drying for 30 minutes in a forced air drier at 100° C. and then firing at 500° C. for 2 hours.

Substrate 1C:

Substrate 1C is prepared according to the procedure of Substrate 1B with the exception that the first component of the $NO_x$ absorber catalyst formulation comprises 74 g/ft$^3$ Pt and the second component comprises 20 g/ft$^3$ Pt.

Substrate 1D:

Substrate 1D is prepared according to the procedure of Substrate 1B with the exception that the first component of the $NO_x$ absorber catalyst formulation comprises 64 g/ft$^3$ and the second component comprises 30 g/ft$^3$ Pt.

EXAMPLE 2

$NO_x$ Testing

The substrates of Example 1 are tested for $NO_x$ storage on a synthetic gas rig at 250° C. using a synthetic gas stream to imitate the exhaust of a Diesel engine. The lean-rich cycle is for of 210 seconds lean and then 30 seconds rich. The results are shown in Table 1, and demonstrate that the substrates of the invention have significantly higher $NO_x$ storage under lean conditions and much lower $NO_x$ slippage during rich conditions. The lower $NO_x$ slippage demonstrates more complete conversion of the desorbed nitrogen oxides during the rich/regeneration phase.

TABLE 1

NOx Storage and Slippage Results

| Substrate | NOx stored in lean period (g) | NOx slipped in rich period (g) |
| --- | --- | --- |
| 1A * | 0.44 | 0.021 |
| 1B | 0.75 | 0.013 |
| 1C | 0.70 | 0.012 |
| 1D | 0.85 | 0.007 |

* Comparative Example

We claim:

1. A $NO_x$ absorber catalyst comprising a substrate monolith coated with one or more washcoat layers and comprising a first component comprising a nitrogen oxide storage component, at least one precious metal and a dispersed rare earth oxide supported on a refractory support material, and a second component comprising a precious metal supported on a bulk reducible oxide that is substantially free of nitrogen oxide storage material, wherein the precious metal present in the second component comprises Pt, Pd or a combination of both Pt and Pd and wherein the bulk reducible oxide is an oxide, a composite oxide or a mixed oxide comprising at least one of manganese, iron, cobalt, copper, tin or cerium.

2. A $NO_x$ absorber catalyst according to claim 1, wherein the first component and the second component are present in the same washcoat layer.

3. A $NO_x$ absorber catalyst according to claim 1, wherein the second component is in a different layer from a layer comprising the first component.

4. A $NO_x$ absorber catalyst according to claim 3, wherein the layer comprising the first component comprises a fourth component comprising a precious metal supported on a bulk reducible oxide, wherein the precious metal present in the second component comprises Pt, Pd or a combination of both Pt and Pd.

5. A $NO_x$ absorber catalyst according to claim 1, wherein the bulk reducible oxide is doped with 0.5 to 80 wt.-% of at least one oxide of an element selected from the group consisting of zirconium, silicon, scandium, yttrium, lanthanum and the rare earth metals or mixtures thereof, based on the total weight of the storage material.

6. A $NO_x$ absorber catalyst according to claim 1, wherein the mixed oxide or composite oxide further comprises zirconium oxide.

7. A $NO_x$ absorber catalyst according to claim 1, wherein the refractory support material in the first component is alumina, magnesia, amorphous silica-alumina, titania, zirconia, a molecular sieve or a mixture, composite oxide or mixed oxide of any two or more thereof.

8. A $NO_x$ absorber catalyst according to claim 7, wherein the refractory support is a homogeneous magnesium aluminate.

9. A $NO_x$ absorber catalyst according to claim 1, wherein the dispersed rare earth oxide in the first component comprises oxides of elements selected from the group consisting of cerium, praseodymium, neodymium, lanthanum, samarium and mixtures thereof.

10. A $NO_x$ absorber catalyst according to claim 1, wherein the nitrogen oxide storage component is selected from the group consisting of alkaline earth metals, alkali metals, rare earth metals and combinations of any two or more thereof.

11. A $NO_x$ storage catalyst according to claim 10, wherein the alkaline earth metal is one or both of barium and strontium.

12. A $NO_x$ absorber catalyst according to claim 1 comprising a plurality of layers, wherein a lower layer comprises the first component and wherein a layer overlying the lower layer comprises a third component comprising rhodium supported on a refractory support material.

13. A $NO_x$ absorber catalyst according to claim 12, wherein a layer overlying the lower layer comprises at least one molecular sieve.

14. A $NO_x$ absorber catalyst according to claim 13 comprising three layers, wherein a layer comprising the molecular sieve is disposed between a layer comprising the lower layer and a layer comprising the third component.

15. A $NO_x$ absorber catalyst according to claim 13 comprising three layers, wherein a layer comprising the molecular sieve overlies a layer comprising the third component.

16. A $NO_x$ absorber catalyst according to claim 13, wherein the molecular sieve is a silicoaluminophosphate (SAPO) or an aluminosilicate zeolite.

17. A $NO_x$ absorber catalyst according to claim 12, wherein an outer layer comprises the second component.

18. An exhaust system for a lean-burn internal combustion engine comprising a $NO_x$ absorber catalyst of claim 1.

19. A method of treating exhaust gas from a lean burn internal combustion engine, which method comprising the steps of contacting lean exhaust gas containing nitric oxide with a $NO_x$ absorber catalyst according to claim 1, and intermittently contacting the $NO_x$ absorber catalyst with enriched exhaust gas.

* * * * *